United States Patent [19]

Valentine

[11] Patent Number: 5,671,383
[45] Date of Patent: Sep. 23, 1997

[54] REGISTER RENAMING IN A SUPERSCALAR MICROPROCESSOR UTILIZING LOCAL AND GLOBAL RENAMER DEVICES

[75] Inventor: Robert Valentine, Qiryat Tivon, Israel

[73] Assignee: Intel Corporation, Santa Clara, Calif.

[21] Appl. No.: 538,845

[22] Filed: Oct. 4, 1995

[51] Int. Cl.[6] .................................................. G06F 9/34
[52] U.S. Cl. .......................... 395/392; 395/376; 395/393; 395/394
[58] Field of Search ................................ 395/392, 393, 395/394, 376

[56] References Cited

U.S. PATENT DOCUMENTS

| | | | |
|---|---|---|---|
| 4,992,938 | 2/1991 | Cocke et al. | 395/393 |
| 5,500,943 | 3/1996 | Ho et al. | 395/394 |
| 5,519,841 | 5/1996 | Sager et al. | 395/412 |
| 5,524,262 | 6/1996 | Colwell et al. | 395/800 |

OTHER PUBLICATIONS

Johnson, Mike, Advanced Micro Devices, *Superscalar Microprocessor Design*, (Prentice Hall 1991).

*Primary Examiner*—Kenneth S. Kim
*Attorney, Agent, or Firm*—Blakely, Sokoloff, Taylor & Zafman

[57] ABSTRACT

Architectural registers for block instructions are renamed by assigning physical register locations to the architectural registers. The physical register locations are consistent with sources and destinations that are produced within a given block. The architectural registers that are renamed are then written to a current machine state. Unknown source operands of the block are renamed with physical register locations consistent with a machine state prior to the current machine state. Local renamer devices rename destination and local sources for blocks of instructions such that the destination and local sources are consistent within each block. One or more global renamers update a current machine state with the renamed block of instructions provided by the local renamers and make unknown sources in the blocks consistent with corresponding destinations from the renamed block of instructions that produced those destinations.

12 Claims, 5 Drawing Sheets

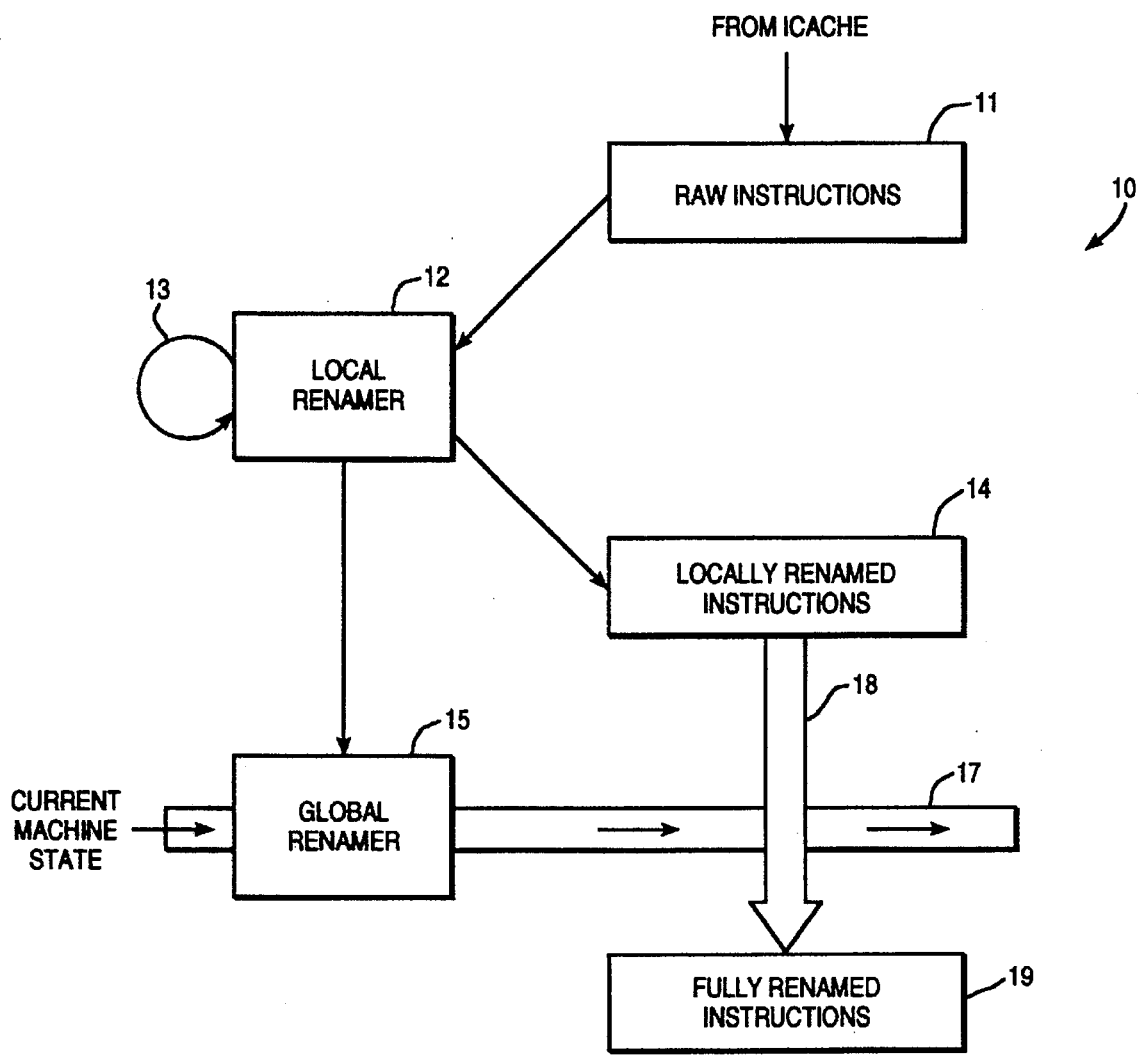
FIG_1

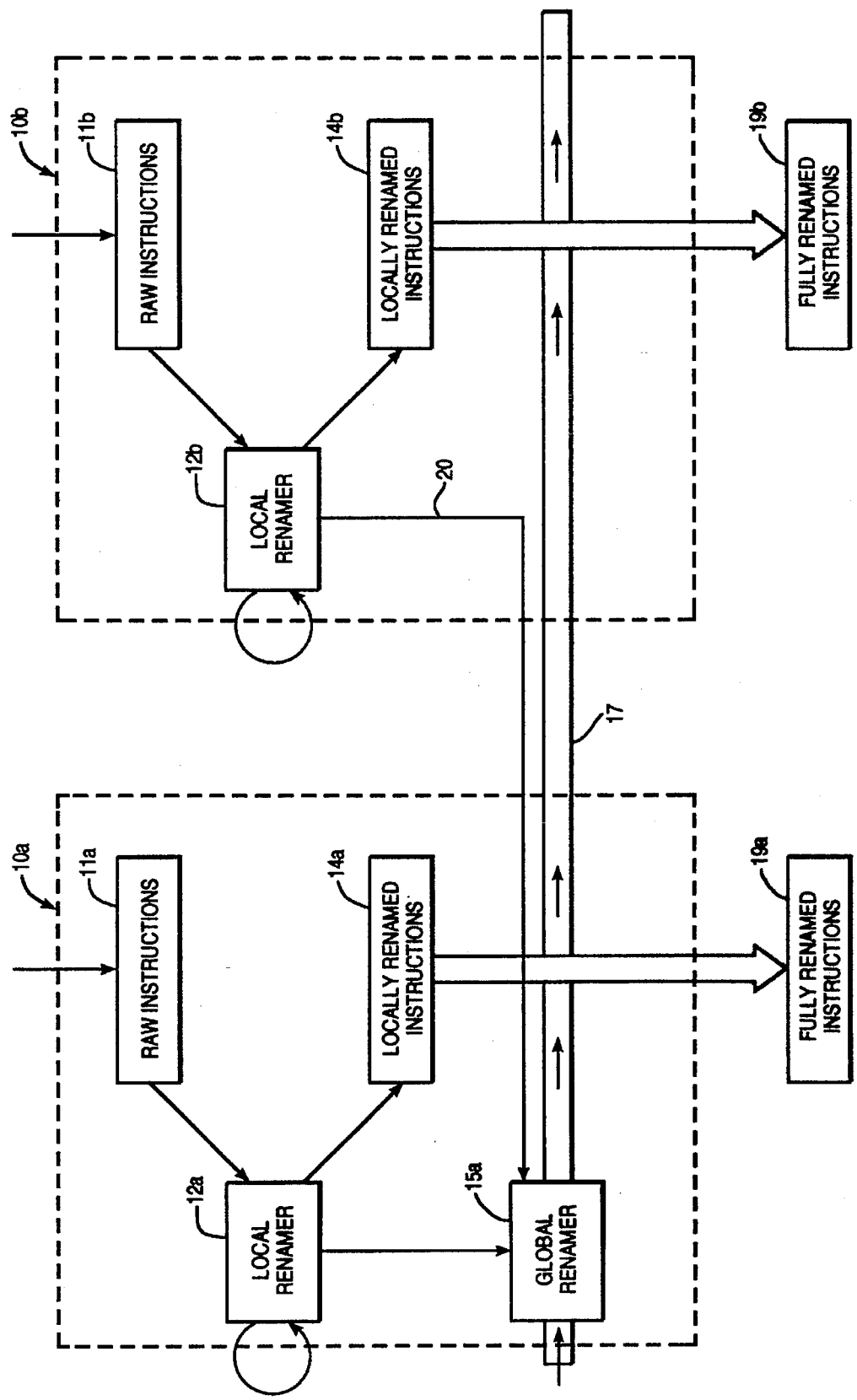
FIG_2

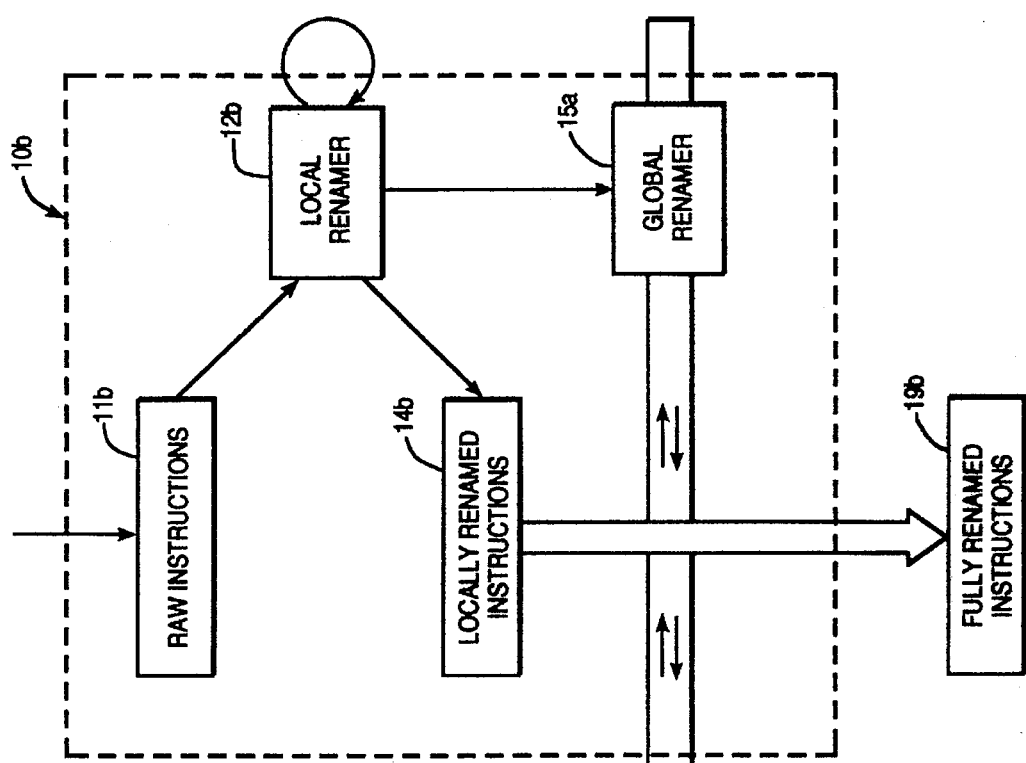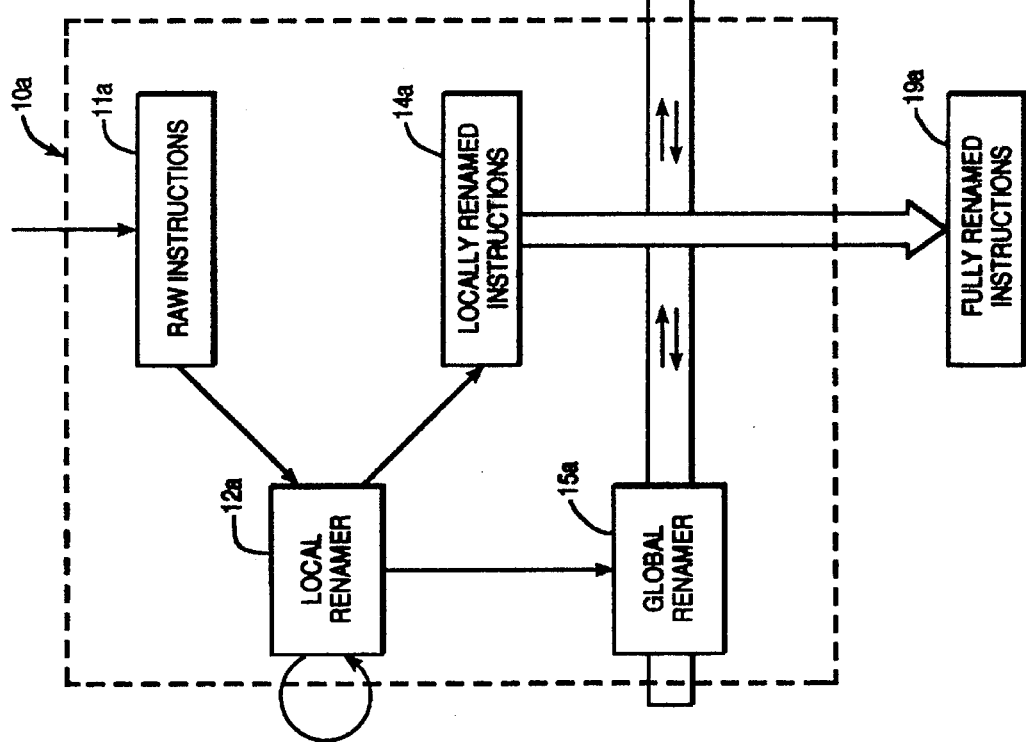
FIG_3

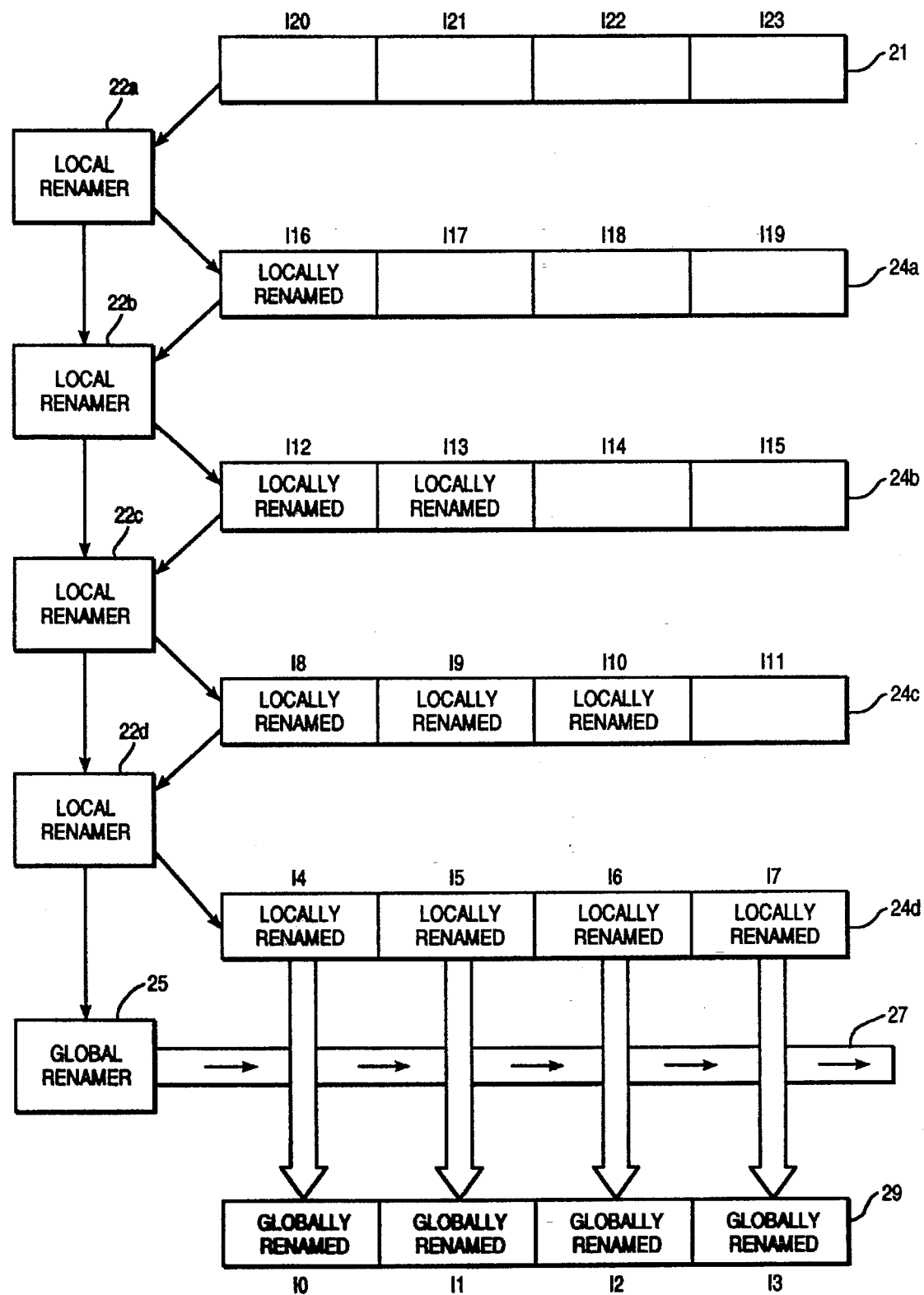
FIG_4

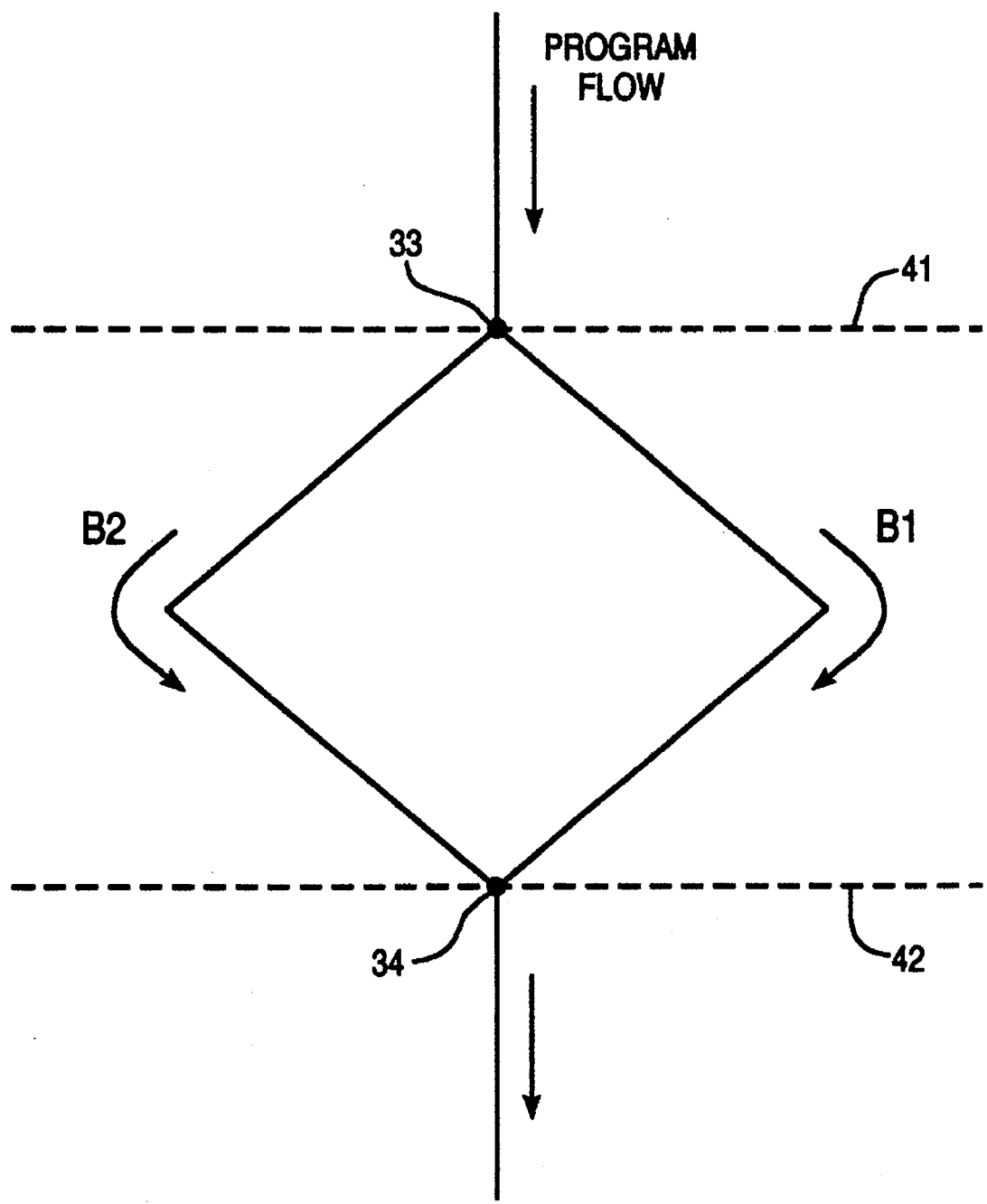
FIG_5

REGISTER RENAMING IN A SUPERSCALAR MICROPROCESSOR UTILIZING LOCAL AND GLOBAL RENAMER DEVICES

FIELD OF THE INVENTION

The present invention relates to the field of computer systems; specifically to instruction control mechanisms with utilize register renaming for increased parallelism.

BACKGROUND OF THE INVENTION

Register renaming is a well known technique that permits parallelism by dynamic allocation of a set of general purpose registers. Register renaming basically involves the use of some sort of mapping scheme to identify a group of registers that are available for the execution of a particular computing task. Renaming of registers operands in superscalar processors allows anti-dependencies (write-after-read) and output dependencies (write-after-write) to be eliminated as scheduling restrictions between instructions. This enables much higher levels of instruction level parallelism than would otherwise be possible.

In a typical register renaming scheme, register numbers appearing in instructions fetched from memory are mapped to a set of physical registers in the machine. A variety of different design approaches exist for renaming registers of incoming instructions. By way of example U.S. Pat. No. 4,992,938 describes a register renaming scheme that employs a co-processor to permit parallelism among floating point operations.

For a superscalar processor of order N (where N represents the maximum number of instructions renamed per clock) the complexity of the dependency checking grows as $N^2$. That is to say, a given instruction N must check its sources against the outputs of the previous N−1 instructions. Further, instruction N−1 must do the same with the N−2 prior instructions, and so on. All instructions therefore, must check their dependencies with the last renamed machine state as well, and the machine state updated with the results of the N renamed instructions. This updating needs to be prioritized such that the latest writer to the register provides the physical name to the renamed machine state. Since each of the N instructions may be the last writer to a given register, and must be prioritized versus the N−1 prior instructions, the overall complexity of the prioritized writes grows quadratically (i.e., $N^2$) as well.

Traditional approaches to renaming have consistently performed this function in a single pipeline stage, with the full conductivity realized in hardware circuitry. The drawback of such approaches is the scalability of the circuitry with greater degrees of superscalarity, since the hardware circuit complexity grows as the square of the order of the degree of superscalarity.

What is needed is a pipelined instruction renaming mechanism that provides the same instruction throughput with complexity that grows linearly with the order of superscalarity, rather than quadradically. As will be seen, the present invention provides just such an apparatus and method.

SUMMARY OF THE INVENTION

The present invention solves problems inherent in instruction dependencies by providing a method and apparatus of register renaming in a computer system executing a program of instructions. According to the present invention, a program for execution in a computer is processed such that a block of instructions are renamed independently of other blocks consistent with a tagging structure that connects different blocks up sometime later in the control flow. The decision to connect independent blocks together provides a real machine state that can be deferred until some later time.

In accordance with one embodiment with the present invention, architectural registers for instruction blocks are renamed by assigning physical register locations to the architectural registers. These physical register locations are consistent with sources and destinations that are produced within the block. The architectural registers that are renamed are then written to a current machine state. Unknown source operands of the block are renamed with physical register locations consistent with a machine state prior to the current machine state. Everything is then repeated for the next block of instructions.

Thus, the concept of the present invention contemplates what may be referred to as "local" and "global" renamer devices. The local renamer devices rename destination and local sources for blocks of instructions such that the destination and local sources are consistent within each block. The global renamer device(s) is utilized to update a current machine state with the renamed block of instructions provided by the local renamer devices. The global renamer device(s) also make unknown sources in the blocks consistent with corresponding destinations from the renamed block of instructions that produced those destinations.

A great variety of different implementations of the present inventions are possible as will be appreciated by a practitioner familiar with the art of computer systems.

BRIEF DESCRIPTION OF THE DRAWINGS

The present invention will be understood more fully from the detailed description which follows and from the accompanying drawings, which however, should not be taken to limit the invention to the specific embodiments shown, but rather explanation and understanding only.

FIG. 1 is block diagram illustrating the basic concept of the present invention.

FIG. 2 is a block diagram illustrating one implementation of a N-wide renamer mechanism in accordance with the present invention.

FIG. 3 is another implementation of the renamer mechanism of the present invention.

FIG. 4 illustrates another possible implementation of the renaming mechanism of the present invention.

FIG. 5 illustrates multiple paths of instruction control flow and segregation of blocks of instructions according to the present invention.

DETAILED DESCRIPTION

An apparatus and method of register renaming for a computer system capable of performing superscalar operations is described. The instruction renaming mechanism of the present invention provides instruction level throughput which is similar to that achieved in prior approaches. The salient distinction, however, is that hardware complexity grows linearly, rather than quadradically with the order of the superscalarity in accordance with the present invention.

Practitioners in the art will further appreciate that the register renaming scheme of the present invention is applicable to a variety of different superscalar computer processing systems. For example, the invention applies equally to complex instruction set computer (CISC) systems, as well as to reduced instruction set computer (RISC) systems. While the register renaming mechanism of the present invention is described in particular embodiments, it will be readily apparent to an ordinary practitioner that other implementations and embodiments are well within the ordinary skill in the art.

The invention has several unique aspects. First, the invention involves segregating a program of instructions into distinct blocks of instructions. Within a given block of instructions, only the physical locations of the updates within the block are known during renaming of the block. This means that a block of instructions can be renamed, according to the invention, before completion of renaming of a prior block. In other words, renaming within any given block may be performed independent of any other block which forms the computer program being executed. Thus, one unique aspect of the present invention is the partitioning scheme referred to as local and global renaming.

Local renaming refers to making the sources and destinations consistent within a renamable block. Local renaming means that a block of instructions can be renamed independently of other blocks; a tagging structure is employed at some later point to connect up all of the blocks. This tagging structure is embodied in the concept of global renaming, which refers to renaming remaining instructions in the block such that the block and the machine state are consistent with one another.

Global renaming refers to connecting up each of the blocks to the actual machine state to preserve consistency throughout. Because local blocks of instructions can be renamed independent of each other, renaming may be pipelined since the machine state is not necessarily needed for renaming of a subsequent block. During global renaming, the sources that were the output of a previous block, are connected as the destinations to the next block in the programmed sequence of instructions. In this way, blocks are attached to each other in a self-consistent manner. An important advantage that the present invention provides is that attaching or connecting the blocks together may be performed atomically, so that as the superscalarity of the processor increases, complexity of instruction level renaming increases linearly.

FIG. 1 illustrates a basic register renaming structure 10 contemplated by the present invention. As can be seen, raw instructions 11 which may be stored in a memory location such as an instruction cache (1CACHE) are provided to a local renamer 12. Local renamer 12 performs the local renaming task for a current block of raw instructions 11. A great variety of well-known circuits, such as a basic re-order buffer or similar common devices capable of renaming individual blocks of instructions may be used to implement local renamer 12. (Note that in FIG. 1, arrow 13 indicates that the renaming of all of the raw instructions in a current block need not be performed all at once.)

After a given block of instructions has completed the local renaming process, the locally renamed instructions 14 must undergo global renaming. This step is performed by global renamer 15 in the structure of FIG. 1. At this stage, the machine state prior to the current renamed block is made consistent with the state of the current renamed block, and the current renamed block is supplied with the physical locations of source registers that were not produced within the block.

During global renaming, all architectural registers which have been updated within the local renamer 12 provide the global renamer 15 with the new physical location of the architectural register. This is done by having the local renamer 12 write all registers which it modified during the local renaming processes with the final physical location where they reside. Source operands which were unknown to local renamer 12 during the renaming of the block, are renamed with the values known by global renamer 15. Conceptually, this is shown in FIG. 1 by arrow 18 and bus structure 17. As the locally renamed instructions 14 "pass" global renamer bus 17, they simply select their source fields, if it was renamed, or the physical name of the architectural register providing the location previously unknown to local renamer 12. The result is a set of fully renamed instructions 19. For the above operations there is simple prioritization, with no dependency on the number of instructions being renamed other than straightforward bussing issues which grow linearly.

It should be understood that fully renamed instructions 19 may be utilized during the immediate execution of the program. Alternatively, they may be stored (e.g., in the instruction cache) for later processing.

FIG. 2 illustrates one potential realization for an N-wide register renamer implemented with N, one-wide renamer structures. The particular example of FIG. 2 shows a two-wide implementation which includes renamer structures 10a and 10b, each comprising respective elements 11, 12, 14, 15, 17, 19. Each local renamer 10 receives a block of N raw instructions in separate clocks. For example, local renamer 12a receives N instructions at a first clock cycle, $CLK_1$, while local renamer 12b receives N instructions at a second clock, $CLK_2$. For an N-wide implementation, local renamer N receives N instructions at clock N. In the embodiment of FIG. 2, the N local renamers are multiplexed to global renamer 15a. As can be seen, local renamer 12a is coupled to global renamer 15a via line 20a, with local renamer 12b being coupled to global renamer 15a via line 20b.

At clock N+1 all of the raw instructions 11a are locally renamed by local renamer 12a and can flow through the global renamer 15a (i.e., pass bus structure 17) while N new raw instructions enter local renamer 12a. The raw instructions may be provided directly from the instruction cache memory or may be held in a temporary, local storage location.

At clock N+2 the same thing happens at local renamer 12b; namely, raw instructions 11 b are locally renamed by local renamer 12b and flow through the global renamer 15a. Locally renamed instructions 14b find their unknown sources consistent with the output of local renamer 12a, thus recursively ensuring correctness. Fully renamed instructions 19a and 19b are therefore consistent with one another.

Practitioners in the art will appreciate the great advantage offered by the present invention. The embodiment of FIG. 2, for example, provides hardware of fixed complexity, instantiated N-times, with the latency of N-clocks. This replaces prior art approaches which must utilize hardware of complexity $N^2$.

FIG. 3 provides an alternative to the N-wide renaming structure of FIG. 2. The embodiment of FIG. 3 is essentially the same as that shown in FIG. 2, except that two global renamers, 15a and 15b are employed rather than multiplexing the outputs of the local renamers with the single global renamer. Raw instructions are provided to the left side (i.e., structure 10a) as well as to the right side (i.e., structure 10b) in the same manner described above. Renamer 12a on the left side functions to coherently rename the raw instructions 11a among themselves. The right side renamer, local renamer 12b, does the same with respect to raw instructions 11b. When locally renamed instructions 14a are available on the left side, they drop across the current machine state which resides in global renamer 15a.

Speaking metaphorically, the block of instructions 14a renamed by renamer 12a may recognize that they use either a real register number consistent within that block, or that they use a register left over from another block. By way of example, the block of instructions may merely recognize that it requires architecture register #4, or whatever name the previous block had for the corresponding register location.

Simultaneously, the exact same process is being performed with a different block of raw instructions 11b on the right side (i.e., structure 10b) in FIG. 3. Basically, the global renamed state "ping-pongs" between global renamers 15a and 15b. This is indicated in FIG. 3 by the bi-directional arrows across bus structure 17. By way of illustration, assume that renamer structure 10a operates to rename a first block of raw instructions, Block$_A$. The globally renamed state is then handed off to the right hand side, renaming structure 10b, which is processing a next sequential block, Block$_B$. Global renamer 15b sees all of the writes from Block$_A$ and updates the global renamed state consistent with the designation and source information provided by that block. The result is that two blocks are renamed in parallel despite the fact that they may be dependent upon each other. Thus, it is appreciated that the embodiment of FIG. 3 provides higher instruction level parallelism than is otherwise possible in existing systems.

The N-cycle latency can be reduced by making the local renamers operate on more than one instruction at a time. If the local renamers are capable of renaming M instructions it implies that their complexity is on the order of $M^2$. However, partitioning still provides linear growth in accordance with the underlying concepts of the present invention. For example, if the local renamers can handle M instructions at a time (i.e., M-wide), then N/M local renamers are required for throughput of N instructions per clock. In this case the latency is N/M. Such a machine scales linearly with an increase in throughput of M instructions per clock per additional local renamers.

An eager execution machine following multiple paths of control flow may also be implemented in accordance with the embodiment of FIG. 3. Instead of using a single global renamer to receive data from all of the local renamers, multiple global renamers are employed; for instance, one per local renamer. Under normal circumstances one of the global renamers would be valid per clock, with the local-to-global update being passed from global renamer to global renamer in the manner described above. In the event that a branch or a "fork" is encountered in the program flow, the machine can be split into subsets, with each of the subsets being able to rename the multiple states independently as they follow the individual paths. Such a situation is illustrated in the flow diagram of FIG. 5.

In FIG. 5, program flow encounters a fork at node 33. At this point, the machine state is split, for example, between renaming structures 10a and 10b in the embodiment of FIG. 3. This means that at the fork node 33, two independent coherent machine states exist, one on each side of the structure of FIG. 3. The independent machine states are handled by associated local and global renamers, independently. By way of example, the program flow through branch B$_1$ may be handled by renaming structure 10a. At the same time, program flow through branch B$_2$ is handled by renaming structure 10b. The machine is essentially cut in half with two completely independent machines that are coherent at the fork state. The splitting of the machines at this point is indicated in FIG. 5 by dashed line 41.

Practitioners in the art should recognize that each side of the renaming machine can continue fetching instructions in the respective control flow streams and, since they both have the same history, they can continue to rename instructions independently. Stated differently, both renaming structures are consistent with the history of the machine. At the point at which the two control flow streams converge (node 34 in FIG. 5) one of the two independent machine states must be kept, while the other is discarded. This means that there is be a selection between one of the two independent machine states, as shown in FIG. 5 by dashed line 42. The selected state is then utilized for future renaming operations.

FIG. 4 illustrates another possible implementation of the linear instruction renaming mechanism of the present invention. The embodiment of FIG. 4 comprises a vertical stack of local renamers 22a–22d that pass their local renamed contents down the stack with each block of instructions. Note that there is no ping-ponging between global renamers in the structure of FIG. 4; instead, the embodiment of FIG. 4 provides an alternate way of pipelining the register renaming of instructions.

The embodiment of FIG. 4 illustrates the use of four local renamers that are capable of renaming one instruction per clock. The single global renamer is capable of being read at four instructions per clock to provide a throughput of four instructions per clock. The example of FIG. 4 shows a series of 24 consecutive instructions ($I_0$–$I_{23}$) that have either been locally renamed, globally renamed, or not yet renamed at all. For example, block 21 represents four instructions $I_{20}$–$I_{23}$. Blocks 24a–24d represent instruction blocks that have either been partially locally renamed or fully locally renamed. For example, block 24a includes instruction $I_{16}$ that has been locally been renamed by renamer 22a, along with raw instructions $I_{17}$–$I_{19}$. Instruction block 24d includes locally renamed instructions $I_4$–$I_7$. As a block of instructions is passed down from a level i to level (i+1), the ith instruction (or ith set of M instructions) is locally renamed, and the local renamer (i+1) receives the updated local state for the block that passed through level i. Thus, the arrangement illustrated in FIG. 4 illustrates multiplexing prior to the global renamer 25.

The momentary time "snap shot" shown in FIG. 4 for this vertical arrangement implements a four-wide renamer using a stack of four, one-wide renamers. Once the block of instructions has been fully locally renamed, it passes the global renamer 25 via bus structure 27 to become globally renamed. In the example of FIG. 4, instructions $I_0$–$I_3$ of block 29 have been globally renamed. In the next clock cycle, instruction $I_4$–$I_7$ will be globally renamed as waves of instructions pass through the vertical structure.

An interesting aspect of the structure shown in FIG. 4 is that instruction $I_7$ has been locally renamed, whereas instruction $I_{11}$ has yet to be dealt with at all. Again, this underscores the fact that blocks of instructions may be renamed locally independent of other blocks according to the present invention.

I claim:

1. A method of register renaming for a superscalar processor executing a program of instructions, the method comprising the steps of:

(a) locally renaming register identifiers associated with first and second blocks of instructions by assigning register locations in a physical register file of the processor to the register identifiers of the first and second blocks of instructions consistent with source operands and destinations specified by the first and second blocks of instructions;

(b) committing the register identifiers renamed in step (a) to the physical register file for first and second machine states of the processor, associated with the first and second blocks of instructions, respectively;

(c) globally renaming unknown source operands of the locally renamed second block with register locations of the physical register file consistent with corresponding destinations of the locally renamed first block of instructions, the global renaming step producing an third machine state.

2. The method according to claim 1 further comprising the initial step of:

segregating the program into the plurality of blocks of instructions.

3. The method according to claim 1 further comprising the step of:

(d) repeating steps (a)–(c) for a next block of instructions.

4. The method according to claim 1 wherein the program includes multiple paths of control flow and wherein steps (a)–(c) are performed independently for each of the multiple paths of control flow.

5. A register renaming apparatus comprising:

local renamer means for renaming destination and local source operands of first and second blocks of N instructions, where N is a positive integer, at first and second clock cycles, respectively, the destination and local source operands being renamed consistent within each block;

global renamer means coupled to the local renamer means, the global renamer means updating a current machine state in the second cycle, or thereafter, by making unknown source operands in the locally renamed second block consistent with corresponding destinations from the locally renamed first block of instructions.

6. The apparatus of claim 5 wherein the local renamer means comprises: N local renamer devices multiplexed to the global renamer means.

7. The apparatus of claim 5 wherein the local renamer means comprising N local renamer devices and the global renamer means comprises N global renamer devices, with the current machine state being passed from one global renamer device to another global renamer device per a clock.

8. The apparatus of claim 5 further comprising means for splitting the current machine state into multiple machine states corresponding to multiple paths of control flow, each of the multiple machine states being updated by an associated one of the N global renamer devices.

9. In a superscalar processor for executing a programmed flow of instructions, a method of register renaming providing a throughput of N instructions per clock comprising the steps of:

(a) providing blocks of M instructions each to N/M local renamers;

(b) renaming each of the blocks in consecutive clock cycles by:

(i) making sources and destinations specified by the instructions of each of the blocks locally consistent; and (ii) updating a current machine state of the superscalar processor by making unknown sources specified by the instructions of each of the blocks globally consistent with corresponding destinations specified in other blocks of instructions.

10. The method according to claim 9 wherein M equals N.

11. The method according to claim 9 wherein M is greater than N.

12. A superscalar processor having a register renaming mechanism comprising:

M local renamers arranged in an ordered stack having i levels, where i is an integer that ranges from 1 to M, such that a local renamer at an ith level of the ordered stack renames sources and destinations associated with a block of N instructions to create an updated local state of the superscalar processor, the updated local state being passed to a local renamer at an (i+1)th level of the ordered stack;

a global renamer coupled to the Mth local renamer for making the updated local state consistent with a current machine state of the superscalar processor by making unknown source operands associated with each of the locally renamed blocks at the Mth level consistent with corresponding destinations specified in other locally renamed blocks of instructions at the Mth level.

\* \* \* \* \*